(12) United States Patent
Watanabe et al.

(10) Patent No.: US 8,441,648 B2
(45) Date of Patent: May 14, 2013

(54) CALIBRATION JIG FOR OPTICAL TOMOGRAPHIC IMAGING APPARATUS AND METHOD FOR GENERATING A CALIBRATION CONVERSION TABLE

(75) Inventors: Daisuke Watanabe, Ashigarakami-gun (JP); Yuichi Teramura, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 745 days.

(21) Appl. No.: 12/496,273

(22) Filed: Jul. 1, 2009

(65) Prior Publication Data

US 2009/0261240 A1    Oct. 22, 2009

(30) Foreign Application Priority Data

Feb. 7, 2008  (JP) ................... 2008-172964
Feb. 7, 2008  (JP) ................... 2008-172965
Feb. 7, 2008  (JP) ................... 2008-172966

(51) Int. Cl.
*G01B 11/02*    (2006.01)
(52) U.S. Cl.
USPC .......................................... 356/479
(58) Field of Classification Search ............ 356/479
See application file for complete search history.

(56) References Cited

U.S. PATENT DOCUMENTS 4,156,571 A * 5/1979 Ljung ........................... 356/445
7,180,600 B2 * 2/2007 Horii et al. ................... 356/479

FOREIGN PATENT DOCUMENTS

| JP | 8-86745 A | 4/1996 |
|---|---|---|
| JP | 2006-215006 A | 8/2006 |
| JP | 2007-101365 A | 4/2007 |
| WO | WO 2007/084849 A1 | 7/2007 |

OTHER PUBLICATIONS

JP Office Action issued in corresponding JP application No. 2008-172966 on Sep. 11, 2012.
JP Office Action issued in corresponding JP application No. 2008-172964 on Jul. 31, 2012.
JP Office Action with partial translation issued in corresponding JP application No. 2008-172966 on Feb. 5, 2013.

* cited by examiner

*Primary Examiner* — Tarifur Chowdhury
*Assistant Examiner* — Jonathon Cook
(74) *Attorney, Agent, or Firm* — Birch, Stewart, Kolasch & Birch, LLP

(57) ABSTRACT

A calibration jig allowing simple and repeatable calibration of a probe optical tomographic apparatus is disclosed. The jig includes a holding member removably attachable to an attachment section of the apparatus and a reflective surface held by the holding member. The reflective surface reflects measurement light emitted from an emitting section of the attachment section and directs reflected light back to the emitting section. If a probe of the apparatus is covered with a sheath, the jig may include a light transmitting member, which generates the same dispersion as dispersion at the sheath, between the emitting section and the reflective surface. The reflective surface may be a single reflective surface disposed within an area corresponding to twice a coherence length of the laser light with a zero path position of the reflective surface being the center of the area.

15 Claims, 10 Drawing Sheets

CALIBRATION JIG FOR OPTICAL TOMOGRAPHIC IMAGING APPARATUS AND METHOD FOR GENERATING A CALIBRATION CONVERSION TABLE

BACKGROUND OF THE INVENTION

1. Field of the Invention

The present invention relates to a calibration jig for an optical tomographic imaging apparatus and a method for generating a calibration conversion table. The present invention particularly relates to a calibration jig which is used for calibrating a probe optical tomographic imaging apparatus with the calibration jig being attached to an attachment section for receiving an optical probe of the optical tomographic imaging apparatus, and a method for generating a calibration conversion table.

2. Description of the Related Art

Optical tomographic imaging apparatuses, which use OCT (Optical Coherence Tomography) measurement, have sometimes been used to acquire tomographic images in body cavity. The optical tomographic imaging apparatus acquires an optical tomographic image of a subject to be measured as follows. First, wideband light emitted from a light source is divided into measurement light and reference light with an optical interferometer. Then, the measurement light is guided through an optical axis scanning means to be applied to the subject to be measured, and the optical axis scanning means scans the subject to be measured with the measurement light in one dimensional or two dimensional direction which is perpendicular to the optical axis. Then, the light reflected from the subject to be measured returns to the interferometer, where the reflected light is combined with the reference light to provide interference light between the reflected light and the reference light. Then, the optical tomographic image is generated based on intensity of the interference light. There are roughly two types of optical axis scanning means: a space scanning system that uses a galvanic mirror or polygon mirror to effect linear scanning with the light propagating in space; and a probe system that guide the light to propagate through an optical fiber and rotates the output end of the optical fiber to effect radial scanning. A typical example of the space scanning system is a fundus OCT apparatus for observing the fundus. Examples of the probe system include a vascular OCT apparatus for observing vascular wall using an optical fiber guided through a vascular catheter, and an endoscopic OCT apparatus which is combined with an endoscope to observe a wall of digestive tract, etc. Examples of the technique used to achieve optical scanning with the probe system include, besides the radial scanning, moving the distal end of the probe to effect linear scanning, or providing a small scanning mechanism in the probe to effect linear scanning.

OCT measurement techniques are roughly classified into TD (Time Domain)-OCT measurement techniques and FD (Fourier Domain)-OCT measurement techniques. Recently, the FD-OCT measurement techniques are attracting attention since they allow high speed measurement. Typical optical tomographic imaging apparatuses that carry out the FD-OCT measurement include an SD (Spectral Domain)-OCT system and an SS (Swept Source)-OCT system.

The SD-OCT system uses wideband low-coherent light, and decomposes the interference light into optical frequency components with a spectral means. Then, intensity of the interference light corresponding to each optical frequency component is measured using a photodetector array, or the like, and thus obtained interference signal is subjected to Fourier transform analysis on a computer, thereby acquiring information of reflectance in the depth direction, i.e., tomographic information.

The SS-OCT system uses, as a light source, a laser with optical frequency thereof swept with time, and measures temporal characteristics of the intensity of the interference light corresponding to temporal change of the frequency of the interference light. Then, thus obtained interference signal is subjected to Fourier transform on a computer, thereby acquiring information of reflectance in the depth direction, i.e., tomographic information.

In the FD-OCT, in order to obtain the tomographic image, i.e., positional information in the depth direction, the interference signal, which has been obtained at equal intervals with respect to a wavenumber k of the measurement light, is subjected to the Fourier transform. However, actual data obtained in the SD-OCT system is obtained at equal intervals with respect to spatial displacement of spectral wavelengths, and actual data obtained in the SS-OCT apparatus is obtained at equal intervals with respect to time. This is because that the relationship between the wavenumber k and the spatial displacement or time is nonlinear due to characteristics of the light source used, influence of components of the apparatus, etc., and thus the Fourier-transformed signal has a distorted waveform. Therefore, when the spatial displacement axis or the time axis is converted into the wavenumber axis, it is necessary to correct for the distortion to achieve correct conversion. An operation of generating a conversion table (calibration conversion table) to be used for this conversion is called calibration.

To achieve the calibration for the SS-OCT system, two types of methods have been proposed. One is a calibration method that corrects only frequency sweep characteristics of the light source, which has the greatest influence. In this method, a part of the measurement light is passed through an interference filter or fiber Bragg grating, and the transmitted light and the reflected light are measured with light receiving elements. Then, a time t-to-wavenumber k characteristic of the light source is calculated from the thus obtained optical signal to generate the calibration conversion table. This method, however, has drawbacks such that an expensive instrument is necessary for evaluation, it allows only correction for distortion of the frequency sweep characteristics of the light source, and influence of dispersion at the interferometer or the probe, for example, cannot be corrected for. The other is a calibration method proposed in Japanese Unexamined Patent Publication No. 2007-101365, which achieves the calibration by using the optical tomographic imaging apparatus itself without using a special instrument as in the method described above. Specifically, the frequency-swept light source is monitored with the optical tomographic imaging apparatus to detect a spectral interference signal as a time signal. Then, time dependency of the sweep frequency is found from the spectral interference signal to calibrate time-dependent characteristics of the sweep frequency of the frequency-swept light source.

On the other hand, for calibrating the SD-OCT system, wavelength of the light is spatially dispersed (decomposed) with a grating and is measured with a detector array. The spatial dispersion at the grating is linear with respect to a wavelength $\lambda$, i.e., the inverse of the wavenumber k. Therefore, in the case of the SD-OCT, influence of the effect of the spatial dispersion at the grating being nonlinear with respect to the wavenumber k is the greatest. In order to correct for only this influence, wavelength dispersion at the grating is theoretically found to generate the calibration conversion table. Alternatively, it is easily conceived to use a spectrometer to measure the wavelength with respect to the spatial displacement to generate the calibration conversion table. In this method, however, influence of the dispersion at the interferometer or probe, for example, cannot be corrected. The dispersion here means change of optical path difference depending on wavelength due to wavelength dependency of refraction index in a medium. The above-mentioned Japanese Unexamined Patent Publication No. 2007-101365 also discloses that a method similar to the above-described method can be applied to the SD-OCT.

The above-mentioned Japanese Unexamined Patent Publication No. 2007-101365, however, does not disclose specific means in a case where the above-described calibration method is used. In a conventional basic OCT experimental apparatus, a measuring device combining a microscope and an optical axis scanning mechanism is placed on a laboratory table, and measurement is carried out with placing a measured sample on the laboratory table. In this view, it is easily conceived that, as a specific means in the case where the above-described calibration method is used, the device placed on the laboratory table may be used in stead of an optical probe, and a mirror reflector may be placed in stead of the measured sample. In this method, however, wavelength distortion characteristics that are different from the characteristics in a case where an optical probe is used are introduced due to influence of optical components, such as a lens, of the measuring device, and this makes the calibration incomplete. Further, ease and convenience are lost due to the size of the apparatus.

The reason is as follows. Unlike the measuring device combining a microscope and an optical axis scanning mechanism placed on the laboratory table, an optical probe used in actual measurement has a small diameter and is long from the nature of the use thereof. Further, since a protective member (sheath) for protecting the optical probe from a living body completely separate the optical axis scanning mechanism from the operator, it is very difficult to hold, fix and finely adjust the optical axis. Therefore, when the optical probe covered with the sheath, which is used in actual measurement, is attached to the attachment section, to which the optical probe is optically coupled in a removable manner, of the optical tomographic imaging apparatus and a some type of reflective member is placed in the vicinity of the distal end of the optical probe to apply the measurement light to the reflective member, it is difficult for the operator to make the reflected light being reflected from the reflective member enter the optical probe with accuracy, and thus the calibration may not be repeatable. In addition, since optical probes used in actual measurement have manufacturing variations, it is more difficult to achieve repeatable calibration if different optical probes are used in calibration operations carried out at different times.

Further, in order to obtain accurate tomographic information of the subject to be measured using the calibrated optical tomographic imaging apparatus, it is desirable to calibrate the optical tomographic imaging apparatus in substantially the same state as the actual state of measurement which is carried out using the optical probe attached to the apparatus. In particular, from the nature of the use, the optical probe is covered with a sheath that transmits light, so that the measurement light from the optical probe transmits through the sheath to be applied to the subject to be measured, and the reflected light from the subject to be measured transmits through the sheath again to enter the optical probe. When the measurement light and the reflected light transmit through the sheath, the measurement light and the reflected light are dispersed due to the wavelength dependency of refraction index, and this distorts the interference signal. Therefore, in order to provide accurate tomographic information of the subject to be measured, it is necessary to correct for the distortion due to the dispersion at the sheath.

Further, the method for generating a calibration conversion table disclosed in the above-mentioned Japanese Unexamined Patent Publication No. 2007-101365 involves cutting out a peak of interest from a plurality of spectral peaks (FIG. 11A) after the interference signal has been Fourier transformed. In general, criteria for selecting a cut-out region A for cutting out the peak largely vary depending on the technique used and conditions, and it is difficult to cut out the peak in a uniform manner. Therefore, this method is time consuming and does not provide high accuracy.

SUMMARY OF THE INVENTION

In view of the above-described circumstances, the present invention is directed to providing a calibration jig for calibrating a probe optical tomographic imaging apparatus in a simple and repeatable manner.

The invention is further directed to providing a calibration jig for calibrating an optical tomographic imaging apparatus in a simple and repeatable manner with correcting for distortion due to dispersion at a sheath of an optical probe.

The invention is yet further directed to providing a calibration jig for optical tomographic imaging apparatus and a method for generating a calibration conversion table, which allow calibration of an optical tomographic imaging apparatus in an easy and repeatable manner without necessitating an operation of cutting out of a peak, which is an operation with a high degree of freedom as described above.

In order to solve the above-described problems, one aspect of the calibration jig according to the invention is a calibration jig for calibrating an optical tomographic imaging apparatus, which apparatus includes an optical probe and an attachment section for optically coupling the optical probe to the apparatus in a removable manner, and acquires a tomographic image of a subject to be measured by: emitting light; dividing the emitted light into reference light and measurement light; emitting the measurement light from an emitting section of the attachment section; guiding the measurement light through the optical probe and applying the measurement light to the subject to be measured; combining the reference light with reflected light, the reflected light being reflected from the subject to be measured and guided through the optical probe; detecting interference light of the combined reference light and reflected light as an interference signal; and acquiring the tomographic image using the interference signal. The calibration jig includes: a holding member removably attachable to the attachment section; and a reflective surface held by the holding member, the reflective surface reflecting the measurement light emitted from the emitting section and directing the reflected light back to the emitting section.

The description "removably attachable to the attachment section" herein refers not only to that the holding member is removably attached to the attachment section via a member or mechanism for securing the holding member to the attachment section, but also may refer to that the holding member is simply placed in the vicinity of the attachment section. The description "held by the holding member" herein refers not only to that the reflective surface is directly held by the holding member, but also may refer to that the reflective surface is held by some other member that is held by the holding member. The description "reflecting the measurement light emitted from the emitting section and directing the reflected light back to the emitting section" refers not only to that the measurement light reflected from the reflective surface directly enters the emitting section, but also may refer to that the reflected light enters the emitting section via an optical system, such as an optical fiber or a collimator lens, disposed between the emitting section and the reflective surface.

In the calibration jig according to the invention, the holding member may also serve as the reflective surface.

The calibration jig according to the invention may further include an attenuator section for attenuating the reflected light reflected at the reflective surface. The description "attenuating the reflected light" herein refers not only to that the reflected light itself is attenuated, but may also refer to that the measurement light applied to the reflective surface is attenuated in advance to effect the attenuation of the reflected light.

In the calibration jig according to the invention, the reflective surface may also serve as the attenuator section.

In the calibration jig according to the invention, the attenuator section may attenuate the reflected light reflected at the reflective surface to provide an intensity of the reflected light in the range from 1 nW to 100 nW.

If the optical probe of the optical tomographic imaging apparatus is covered with a sheath, which transmits the measurement light to be applied to the subject to be measured and transmits the reflected light to be guided through the optical probe, the calibration jig may include a light transmitting member disposed between the emitting section and the reflective surface, which light transmitting member transmits the measurement light and the reflected light reflected from the reflective surface, and generates the same dispersion as dispersion generated when the measurement light and the reflected light reflected from the subject to be measured transmit through the sheath.

The description "covered with a sheath" herein not necessarily means that the sheath covers the entire circumference of the optical probe. It suffices that the sheath covers a portion of the optical probe from which the measurement light is emitted. The description "between the emitting section and the reflective surface" herein refers to a position in the optical path between the emitting section and the reflective surface. The "dispersion generated when the measurement light and the reflected light reflected from the subject to be measured transmit through the sheath" refers to change in the optical path difference due to wavelength dependency of the refraction index of the sheath, i.e., color dispersion generated by the material forming the sheath.

In the calibration jig according to the invention, the holding member may also serve as the light transmitting member.

In the calibration jig according to the invention, the reflective surface held by the holding member may provide a uniform optical path length from the emitting section to the reflective surface at the entire surface of the reflective surface and may cover substantially a half or more in a circumferential direction of an outer circumference of the holding member.

The description "a uniform optical path length from the emitting section to the reflective surface" herein refers to that the optical path length from the emitting section to the reflective surface is the same at any position on the reflective surface. The "outer circumference of the holding member" does not refers to the entire outer circumference of the holding member, but refers to a portion of the outer circumference of the holding member through which the measurement light and reflected light transmit.

Another aspect of the calibration jig according to the invention is a calibration jig for calibrating an optical tomographic imaging apparatus, which apparatus includes an optical probe and an attachment section for optically coupling the optical probe to the apparatus in a removable manner, and acquires a tomographic image of a subject to be measured by: emitting laser light from a frequency-swept laser light source with temporally swept optical frequency; dividing the laser light into reference light and measurement light; emitting the measurement light from an emitting section of the attachment section; guiding the measurement light through the optical probe and applying the measurement light to the subject to be measured; combining the reference light with reflected light, the reflected light being reflected from the subject to be measured and guided through the optical probe; detecting interference light of the combined reference light and reflected light as an interference signal; and acquiring the tomographic image using the interference signal. The calibration jig includes: a holding member removably attachable to the attachment section; and a single reflective surface held by the holding member, the single reflective surface being disposed within an area corresponding to twice a coherence length of the laser light, a center of the area being a position of the reflective surface at which the measurement light reflected at the reflective surface has a same optical path length as an optical path length of the reference light from a point at which the laser light is divided into the reference light and the measurement light to a point at which the reference light and the measurement light are combined.

Yet another aspect of the calibration jig according to the invention is a calibration jig for calibrating an optical tomographic imaging apparatus, which apparatus includes an optical probe and an attachment section for optically coupling the optical probe to the apparatus in a removable manner, and acquires a tomographic image of a subject to be measured by: dividing low-coherent light having a wide emission wavelength band into reference light and measurement light; emitting the measurement light from an emitting section of the attachment section; guiding the measurement light through the optical probe and applying the measurement light to the subject to be measured; combining the reference light with reflected light, the reflected light being reflected from the subject to be measured and guided through the optical probe; spatially dispersing interference light of the combined reference light and reflected light with respect to frequency and detecting the interference light as an interference signal with a plurality of spatially arrayed light receiving elements; and acquiring the tomographic image using the interference signal. The calibration jig includes: a holding member removably attachable to the attachment section; and a single reflective surface held by the holding member, the single reflective surface being disposed within a measurable range determined by a wavelength width of the low-coherent light entering each one of the light receiving elements.

In the case where a frequency-swept laser light source is used, the "single reflective surface" herein refers to a reflective surface which reflects the measurement light and directs the reflected light back to the emitting section, and which reflective surface is an only reflective surface present within an area corresponding to twice a coherence length of the laser light at a certain instant, with the center of the area being a position of the reflective surface at which the measurement light reflected at the reflective surface has the same optical path length as an optical path length of the reference light from a point at which the laser light is divided into the reference light and the measurement light to a point at which the reference light and the measurement light are combined. On the other hand, in the case where a light source having a wide emission wavelength band is used, and the signal from the subject to be measured is split into spectral components and is detected with a photodetector array, the "single reflective surface" refers to a reflective surface which reflects the measurement light and directs the reflected light back to the emitting section, and which reflective surface is an only reflective surface present within a measurable range of the detector, which is determined by the number of pixels of the detector. It should be noted that the description "reflects the measurement light and directs the reflected light back to the emitting section" herein refers not only to that the reflected light, which is the reflected measurement light, directly enters the emitting section, but may also refer to that the reflected light enters the emitting section via an optical system, such as an optical fiber or a collimator lens, disposed between the emitting section and the reflective surface.

The "wavelength width of the low-coherent light entering each one of the light receiving elements" herein refers to a wavelength width that is spatially allocated to each light receiving element when the interference light is spatially dispersed with respect to the frequency and the interference signal is received with a plurality of spatially arrayed light receiving elements.

An aspect of the method for generating a calibration conversion table according to the invention is a method for generating a calibration conversion table using a calibration jig for calibrating an optical tomographic imaging apparatus. The calibration jig includes a holding member removably attachable to an attachment section of the optical tomographic imaging apparatus, and a reflective surface held by the holding member, the reflective surface reflecting measurement light emitted from an emitting section of the attachment section and directing reflected light back to the emitting section. The calibration conversion table represents a relationship between wavenumber and time and is used for converting a first interference signal plotted along a time axis with constant time intervals into a second interference signal plotted along a wavenumber axis with constant wavenumber intervals. The first interference signal is obtained by: attaching the calibration jig to the attachment section to optically couple the calibration jig to the apparatus in a removable manner; emitting laser light from a frequency-swept laser light source with temporally swept optical frequency; dividing the laser light into reference light and the measurement light; emitting the measurement light from the emitting section; guiding the measurement light through the calibration jig and applying the measurement light to the reflective surface; combining the reference light with reflected light, the reflected light being reflected from the reflective surface and guided through the calibration jig; and detecting interference light of the combined reference light and reflected light as the first interference signal. The method includes: extracting a group of points from the first interference signal plotted along the time axis, the group of points being to be plotted at equal intervals in the second interference signal plotted along the wavenumber axis; finding a time value corresponding to each point of the group of points; plotting, based on the time values, the group of points on the calibration conversion table at equal intervals along the wavenumber axis of the calibration conversion table; and interpolating between the plotted points of the group of points.

Another aspect of the method for generating a calibration conversion table according to the invention is a method for generating a calibration conversion table using a calibration jig for calibrating an optical tomographic imaging apparatus. The calibration jig includes a holding member removably attachable to an attachment section of the optical tomographic imaging apparatus, and a reflective surface held by the holding member, the reflective surface reflecting measurement light emitted from an emitting section of the attachment section and directing reflected light back to the emitting section. The calibration conversion table represents a relationship between wavenumber and displacement and is used for converting a first interference signal plotted along a displacement axis with constant displacement intervals into a second interference signal plotted along a wavenumber axis with constant wavenumber intervals. The first interference signal is obtained by: attaching the calibration jig to the attachment section to optically couple the calibration jig to the apparatus in a removable manner; dividing low-coherent light having a wide emission wavelength band into reference light and the measurement light; emitting the measurement light from the emitting section; guiding the measurement light through the calibration jig and applying the measurement light to the reflective surface; combining the reference light with reflected light, the reflected light being reflected from the reflective surface and guided through the calibration jig; and spatially dispersing interference light of the combined reference light and reflected light with respect to frequency and detecting the interference light as the first interference signal with a plurality of spatially arrayed light receiving elements. The method includes: extracting a group of points from the first interference signal plotted along the displacement axis, the group of points being to be plotted at equal intervals in the second interference signal plotted along the wavenumber axis; finding a displacement value corresponding to each point of the group of points; plotting, based on the displacement values, the group of points on the calibration conversion table at equal intervals along the wavenumber axis of the calibration conversion table; and interpolating between the plotted points of the group of points.

The axis with "constant time intervals" or "constant displacement intervals" herein refers to an axis which is expressed to have a constant interval per unit time or unit displacement.

The method for generating a calibration conversion table according to the invention may further include: if a wavenumber spectrum of the first interference signal of the interference light contains a peak other than a peak corresponding to the reflective surface, cutting out a region of the peak corresponding to the reflective surface from the wavenumber spectrum; applying inverse Fourier transform to the cut out region of the wavenumber spectrum to form a transformed interference signal; and extracting the group of points from the transformed interference signal.

DESCRIPTION OF THE PREFERRED EMBODIMENTS

Hereinafter, a calibration jig for an optical tomographic imaging apparatus according to the present invention will be described in detail with reference to the drawings.

Figure 1:
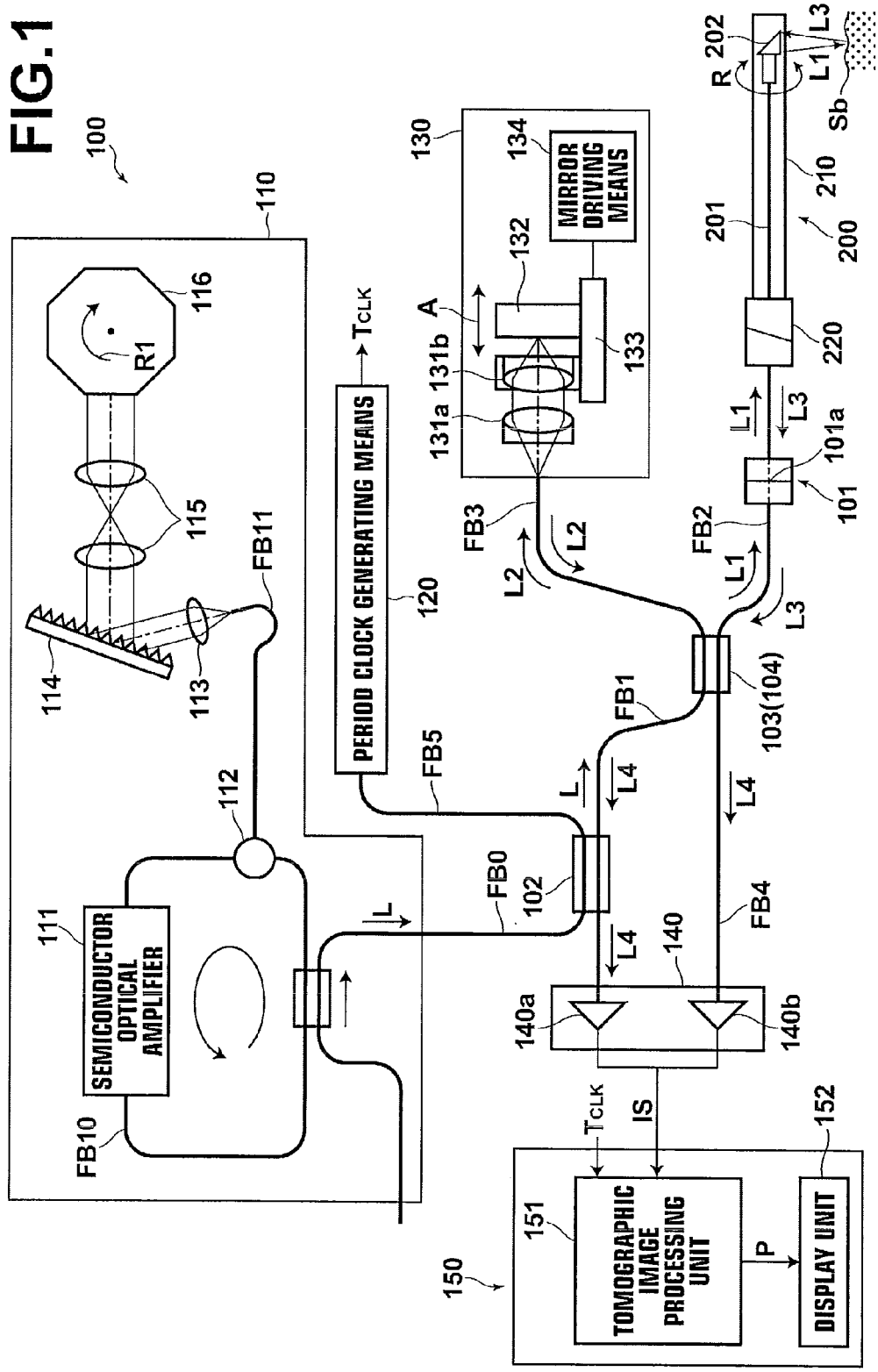
FIG. 1 is a diagram illustrating the schematic configuration of an optical tomographic imaging apparatus and an optical probe.

First, an optical tomographic imaging apparatus, which is calibrated using the calibration jig of the invention, and an optical probe are described. FIG. 1 illustrates the schematic configuration of the optical tomographic imaging apparatus and the optical probe. As one example, the optical tomographic imaging apparatus 100 acquires a tomographic image of a subject to be measured through SS-OCT measurement.

The optical tomographic imaging apparatus 100 includes: a light source unit 110, which emits laser light L; an optical fiber coupler 102, which divides the laser light L emitted from the light source unit 110; a period clock generating means 120, which outputs a period clock signal $T_{CLK}$ from the light divided by the optical fiber coupler 102; a light dividing means 103, which divides one of the light beams divided by the optical fiber coupler 102 into measurement light L1 and reference light L2; an optical path length adjusting means 130, which adjusts the optical path length of the reference light L2; a combining means 104, which combines the reference light L2 with reflected light L3 that is reflected from the subject to be measured Sb and guided through an optical probe 200 (which is optically coupled to an attachment section 101 of the optical tomographic imaging apparatus 100 in a removable manner) when the measurement light L1 is guided through the optical probe 200 and is applied from the optical probe 200 to the subject Sb; an interference light detecting means 140, which detects interference light L4 between the reflected light L3 and the reference light L2 combined by the combining means 104; and a tomographic image acquiring means 150, which acquires a tomographic image P of the subject to be measured Sb by applying frequency analysis to an interference signal IS detected by the interference light detecting means 140, and displays the tomographic image P.

The light source unit 110 emits the laser light L with the wavelengths λ thereof swept in a constant period. The light source unit 110 includes a semiconductor optical amplifier 111 and an optical fiber FB10. The optical fiber FB10 is connected to opposite ends of the semiconductor optical amplifier 111. The semiconductor optical amplifier 111 emits weak laser light to one end of the optical fiber FB10 when a driving current is supplied, and amplifies the incoming laser light from the other end of the optical fiber FB10. Thus, when the driving current is supplied to the semiconductor optical amplifier 111, the laser light L generated at an optical resonator formed by the semiconductor optical amplifier 111 and the optical fiber FB10 is emitted to an optical fiber FB0.

A circulator 112 is coupled to the optical fiber FB10, so that the light guided through the optical fiber FB10 is emitted from the circulator 112 to an optical fiber FB11. The light emitted from the optical fiber FB11 travels through a collimator lens 113, a diffraction optical element 114 and an optical system 115, and is reflected at a rotating polygon mirror 116. The reflected light travels back through the optical system 115, the diffraction optical element 114 and the collimator lens 113, and re-enters the optical fiber FB11.

The rotating polygon mirror 116 rotates at a high speed, such as around 30,000 rpm, in the direction of arrow R1, and the angle of each reflection facet with respect to the optical axis of the optical system 115 changes during the rotation. Thus, among the spectral components of the light split by the diffraction optical element 114, only a component of the laser light L corresponding to a particular wavelength λ, which is determined by an angle formed between the optical axis of the optical system 115 and the reflection facet at a certain instant, returns to the optical fiber FB11. Then, the light of the particular wavelength λ entering the optical fiber FB11 is emitted from the circulator 112 to the optical fiber FB10. As a result, the laser light L of the particular wavelength range is emitted to the optical fiber FB0. As the rotating polygon mirror 116 rotates at a constant speed in the direction of arrow R1, the wavelength λ of the light re-entering the optical fiber FB11 changes with time in a constant period.

The optical fiber coupler 102 is connected to the optical fiber FB0 to branch the path to an optical fiber FB1 and to an optical fiber FB5. The light entering the optical fiber FB1 is guided to the light dividing means 103, and the light entering the optical fiber FB5 enters the period clock generating means 120, which generates the period clock $T_{CLK}$ in the sweep period.

The period clock generating means 120 outputs one period clock signal $T_{CLK}$ to the tomographic image acquiring means 150 each time the wavelength λ of the laser light L emitted from the light source unit 110 is swept for one period.

The light dividing means 103 is formed, for example, by a 2×2 optical fiber coupler, and divides the laser light L guided from the light source unit 110 via the optical fiber FB1 into the measurement light L1 and the reference light L2 at a ratio of 99:1. Specifically, in this embodiment, the laser light L is divided to provide the measurement light L1 having a light amount of 9.9 mW and the reference light L2 having a light amount of 100 μW as one example, although this is not intended to limit the invention. The light dividing means 103 is optically coupled to two optical fibers FB2 and FB3, so that the measurement light L1 is guided through the optical fiber FB2 to be emitted to the optical probe 200 and the reference light L2 is guided through the optical fiber FB3 to be emitted to the optical path length adjusting means 130. It should be noted that the optical fiber coupler in this embodiment serves both as the light dividing means 103 and the combining means 4.

The optical path length adjusting unit 130 changes the optical path length of the reference light L2 to adjust the position at which acquisition of the tomographic image P is started. The optical path length adjusting unit 130 includes: a reflection mirror 132, which reflects the reference light L2 emitted from the optical fiber FB3; and a first optical lens 131a and a second optical lens 131b disposed between the reflection mirror 132 and the optical fiber FB3.

The optical path length adjusting unit 130 further includes: a base 133, on which the second optical lens 131b and the reflection mirror 132 are secured; and a mirror driving means 134, which moves the base 133 along the optical axis of the first optical lens 131a. The optical path length of the reference light L2 can be changed by moving the base 133 in the direction of arrow A.

The combining means 4 is formed by a 2×2 optical fiber coupler, as described above, and combines the reference light L2 having the optical path length adjusted by the optical path length adjusting unit 130 with the reflected light L3 reflected from the subject to be measured Sb. The interference light L4 formed between the combined light is guided through an optical fiber FB4 and enters the interference light detecting means 140.

The interference light detecting means 140 detects the interference light L4 between the reflected light L3 and the reference light L2 combined by the combining means 4, and outputs a time domain waveform of the intensity of the interference light L4 as the interference signal IS. It should be noted that, in this embodiment, the interference light L4 is divided at the combining means 104 at a ratio of 50:50 to enter photodetectors 140a and 140b to achieve balanced detection, as one example. The detected interference signal IS is A/D converted and fed to the tomographic image processing unit 150.

In the tomographic image acquiring means 150, a tomographic image processing unit 151 executes a tomographic image generation program to generate the tomographic information of the subject to be measured Sb from the A/D converted interference signal IS, and a display unit 152 displays the generated tomographic image P. In this embodiment, the operation carried out by the tomographic image acquiring means 150 is processed on an externally connected computer and the acquired image is displayed on the display unit 152 of the computer, as one example. However, the operation carried out by the tomographic image acquiring means 150 may be processed on the optical tomographic imaging apparatus 100 and the acquired image may be displayed on the display unit 152 of the optical tomographic imaging apparatus 100. The processing of the A/D converted interference signal IS by the tomographic image processing unit 151 will be described later.

The attachment section 101, which optically couples the optical probe 200 to the optical fiber FB2, is provided at a housing of the optical tomographic imaging apparatus 100. The attachment section 101 includes an emitting section 101a, from which the measurement light L1 fed from the optical fiber FB2 is emitted. In this embodiment, the attachment section is formed by an optical connector 101 provided at the housing of the optical tomographic imaging apparatus 100, and the emitting section is formed by a center portion 101a of the optical connector 101, as one example, although this is not intended to limit the invention.

The optical probe 200 is attached to the optical connector 101, thereby optically coupling the optical probe 200 to the optical fiber FB2 in a removable manner. Thus, the measurement light L1 emitted from the optical fiber FB2 is fed to the optical probe 200.

The optical probe 200 includes a distal end portion 210, which is inserted into a body cavity through, for example, a forceps channel of an endoscope, and a driving unit 220. The optical probe 200 contains the optical fiber 201 that extends along substantially the entire length of the optical probe 200. When the optical probe 200 is attached to the optical connector 101, the optical fiber 201 is optically coupled to the optical fiber FB2 at the center portion 101a. The optical fiber 201 is divided at a point between the distal end portion 210 and the driving unit 220, and the divided portions of the optical fiber 201 are joined to each other via an optical rotary joint (not shown) so that the portion of the optical fiber 201 at the distal end portion 210 side is rotatable relative to the portion of the optical fiber 201 at the driving unit 220 side. By removing the distal end portion 210, the rotary joint (not shown) could be used as the above-described attachment section for attaching the calibration jig to the optical tomographic imaging apparatus 100.

A distal end optical system 202 is disposed at the distal end of the optical fiber 201. The distal end optical system 202 directs the measurement light L1 to the subject to be measured Sb and directs the reflected light L3 from the subject to be measured Sb to the optical fiber 201. It is assumed here that the subject to be measured Sb provides a single reflection point like a delta function with respect to the optical axis. The portion of the optical fiber 201 at the distal end portion 210 side is rotated about the longitudinal axis of the optical fiber 201 (in the direction of arrow R in the drawing) by a driving motor (not shown) built in the driving unit 220. Thus, the measurement light L1 emitted from the distal end optical system 202 is moved to scan about the longitudinal axis of the optical fiber 201 (in the direction of arrow R in the drawing).

Figure 2:
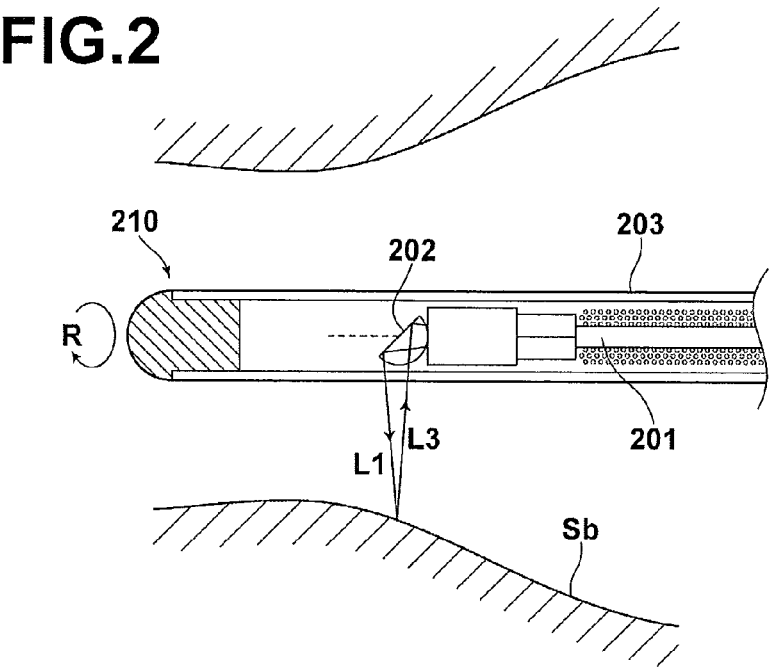
FIG. 2 is a diagram illustrating the schematic configuration of a distal end portion of the optical probe.

FIG. 2 illustrates the schematic configuration of the distal end portion of the optical probe 200. As shown in FIG. 2, the distal end portion 210 of the optical probe 200 is covered with a substantially cylindrical sheath 203. The measurement light L1 guided through the optical fiber 201 and emitted from the distal end optical system 202 transmits through the sheath 203 to be applied to the subject to be measured Sb. The reflected light L3 from the subject to be measured Sb transmits through the sheath 203 and enters the distal end optical system 202 to be guided through the optical fiber 203. Therefore, the measurement light L1 and the reflected light L3 transmitted through the sheath 203 are dispersed at the sheath 203.

Figure 3:
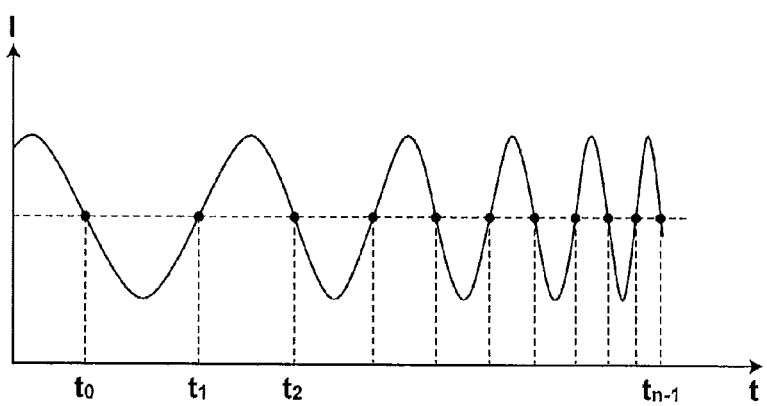
FIG. 3 is a graph illustrating an interference signal IS fed to a tomographic image processing unit.

The tomographic image processing unit 151 obtains, based on the period clock $T_{CLK}$ fed from the period clock generating means 120, the interference signal IS for one sweep period detected by the interference light detecting means 140. FIG. 3 illustrates the interference signal IS to be fed to the tomographic image processing unit 151 in a case where the subject to be measured Sb provides a single reflection point. As described above, the interference signal IS represents a time domain waveform of the intensity of the interference light L4. In FIG. 3, the transverse axis represents the time t and the vertical axis represents the intensity I of the interference light L4.

Figure 4:
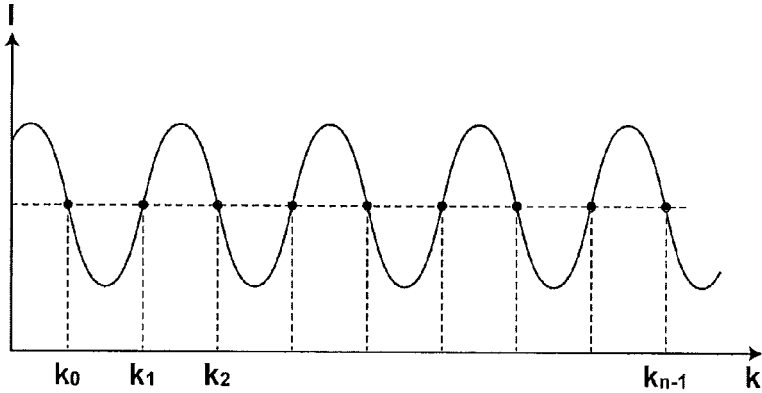
FIG. 4 is a graph illustrating a rearranged interference signal IS.

When the subject to be measured Sb provides a single reflection point, the interference signal IS should take the form of a sine wave having a single frequency with respect to the wavenumber k. In practice, however, the wavenumber k is not linear with respect to the time axis due to characteristics of the light source unit 110, influence of components of the apparatus, etc., and therefore the interference signal IS does not take the form a sine wave having a single frequency with respect to the time axis, as shown in FIG. 3. As described above, however, in order to obtain the accurate tomographic image P of the subject to be measured Sb at the tomographic image processing unit 151, the interference signal IS needs to be rearranged to have a single frequency with respect to the wavenumber k ($=2\pi/\lambda$), as shown in FIG. 4. The tomographic image processing unit 151 is therefore provided with a time t-to-wavenumber k calibration conversion table or calibration conversion function that is obtained by calibrating the optical tomographic imaging apparatus 100. Using the time t-to-wavenumber k calibration conversion table or calibration conversion function, the tomographic image processing unit 151 rearranges the interference signal IS at equal intervals, i.e., to have a single frequency, with respect to the wavenumber axis k. In this manner, when the tomographic image processing unit 151 calculates the tomographic information from the interference signal IS, the tomographic image processing unit 151 can acquire highly accurate tomographic information by using a spectral analysis technique that assumes that the interference signal IS is arranged at equal intervals with respect to the wavenumber k, such as the Fourier transform or processing using the maximum entropy method. Details of this conversion technique are disclosed in U.S. Pat. No. 5,956,355.

The tomographic image processing unit 151 obtains the tomographic information of the subject to be measured Sb for one sweep period by applying a spectral analysis technique, such as the Fourier transform, the maximum entropy method, the Yule-Walker method, or the like, to the converted interference signal IS.

The tomographic image processing unit 151 obtains the tomographic information of individual positions of the subject to be measured Sb exposed to the measurement light L1 which is emitted from the distal end of the optical probe 200 and moved to scan about the axis of the optical fiber 201. Then, based on a signal fed from, for example, the an encoder included in the driving unit 220 of the optical probe 200, the tomographic image processing unit 151 generates the tomographic information of the subject to be measured Sb corresponding to the entire scan about the fiber axis, and the information is displayed on the display unit 152 as the tomographic image P.

Next, a first embodiment of a calibration jig 1 of the invention is described. As shown in FIG. 1, the calibration jig 1 is removably attached to the optical connector 101, which is one example of the attachment section of the optical tomographic imaging apparatus 100. FIGS. 5A to 5D illustrate variations of the first embodiment of the calibration jig 1. The calibration jig 1 is mainly formed by a holding member 2, which is attachable to the optical connector 101, and a reflective member 3, which reflects the measurement light L1.

The holding member 2 in this embodiment is removably attached to the optical connector 101 via an optical connector 2a, which can fit with the optical connector 101. It should be noted that the means for achieving the removable attachment of the holding member 2 to the optical connector 101 is not limited to the optical connector 2a provided at the holding member 2, and the removable attachment may be achieved by other means, such as securing the holding member 2 to the housing of the optical tomographic imaging apparatus 100 with a screw, or supporting the holding member 2 with another support member, or the like, to position the holding member 2 in the vicinity of the optical connector 101.

The holding member 2 also holds the reflective member 3, which reflects the measurement light L1 emitted from the center portion 101a, which is one example of the emitting section, of the optical connector 101. The reflective member 3 may directly be held by the holding member 2, or may indirectly be held by the holding member 2 via an adaptor.

Further, the holding member 2 guides the measurement light L1 emitted from the center portion 101a to the reflective member 3. In this embodiment, the measurement light L1 is indirectly guided to the reflective member 3 via an optical fiber 2b connected to the optical connector 2a, although this is not intended to limit the invention. The measurement light L1 may be guided via an optical system, which is provided in place of the optical fiber 2b, or may be guided via both the optical fiber 2b and an optical system 2c, as shown in FIG. 5B. Alternatively, the measurement light L1 may directly be guided to the reflective member 3.

As described above, the reflective member 3 is directly or indirectly held by the holding member 2, and includes a reflective surface 3a, which reflects the measurement light L1 emitted from the center portion 101a. The reflective surface 3a is polished or coated so that the light reflected at the reflective surface 3a has a predetermined intensity. It should be noted that the form of the reflective member 3 is not particularly limited, and the optical fiber 2b in the calibration jig 1 may also serve as the reflective member 3, as shown in FIG. 5C. That is, in the case where the optical fiber 2b also serves as the reflective member 3, a fiber end of the optical fiber 2b forms the reflective surface 3a.

Although there is a space between the optical fiber 2b and the reflective member 3 in the above description, the reflective member 3 may be secured at an end face of the optical fiber 2b. For example, as shown in FIG. 5D, an interface 3a' between a reflective member 3' and a reflective member 3" having different refraction indices may be used to form the reflective surface.

Figure 6A:
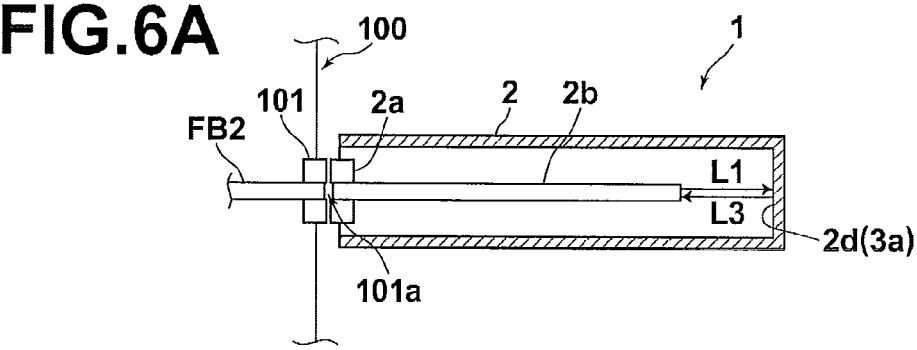
FIG. 6A is a diagram illustrating a variation of a calibration jig according to a second embodiment.
Figure 6B:
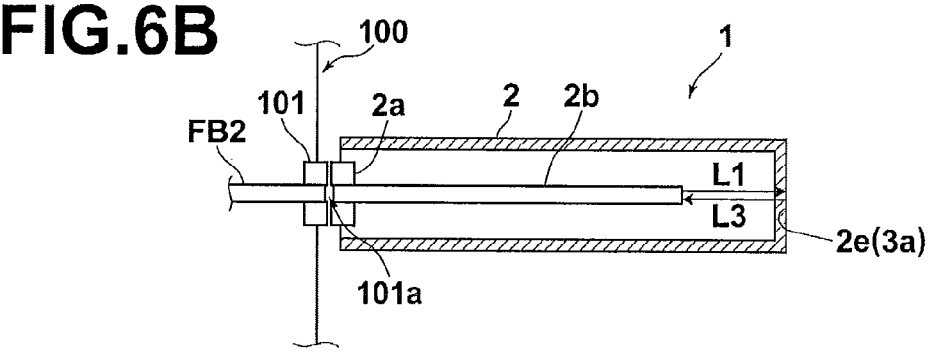
FIG. 6B is a diagram illustrating another variation of the calibration jig according to the second embodiment.
Figure 6C:
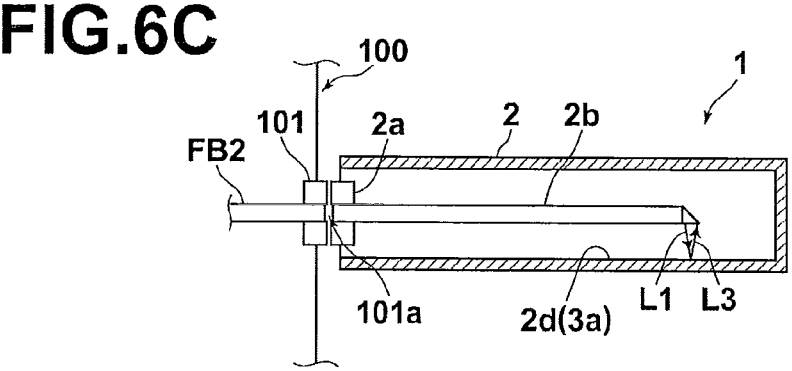
FIG. 6C is a diagram illustrating yet another variation of the calibration jig according to the second embodiment.
Figure 6D:
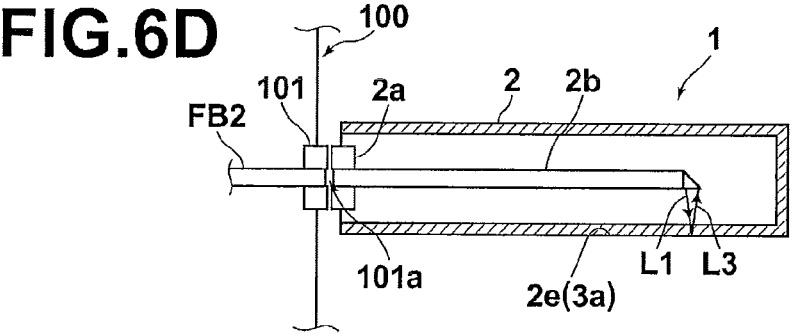
FIG. 6D is a diagram illustrating still another variation of the calibration jig according to the second embodiment.

Next, a second embodiment of the calibration jig 1 is described. As in variations shown in FIGS. 6A to 6D, the holding member 2 of the calibration jig 1 of this embodiment includes the reflective surface 3a which forms the entire or a part of the holding member 2 so that the holding member 2 also serves as the reflective member 3. FIG. 6A shows a case where the reflective surface 3a is formed on an inner surface 2d of the holding member 2. FIG. 6B shows a case where the entire or a part of the holding member 2 is formed of a light transmitting material and the reflective surface 3a is formed on an outer surface 2e of the holding member 2. Alternatively, as shown in FIGS. 6C and 6D, an optical system may be provided at the distal end of the optical fiber 2b to change the traveling direction of the measurement light L1. Other features of the calibration jig 1 of this embodiment are the same as those in the first embodiment and explanation thereof is omitted.

Figure 7A:
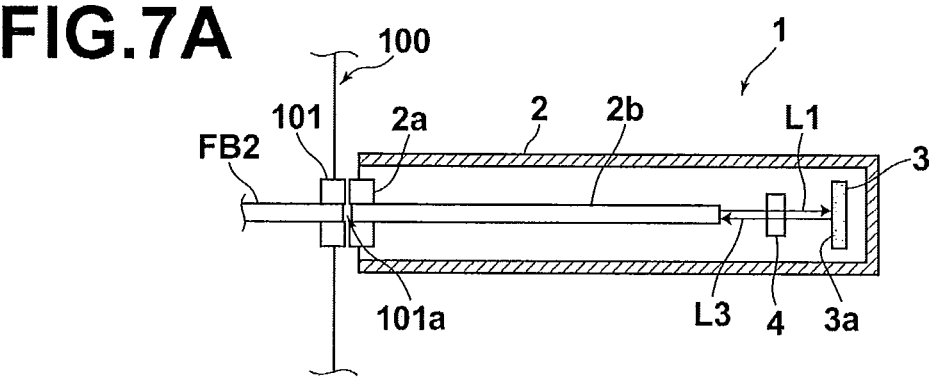
FIG. 7A is a diagram illustrating a variation of a calibration jig according to a third embodiment.
Figure 7B:
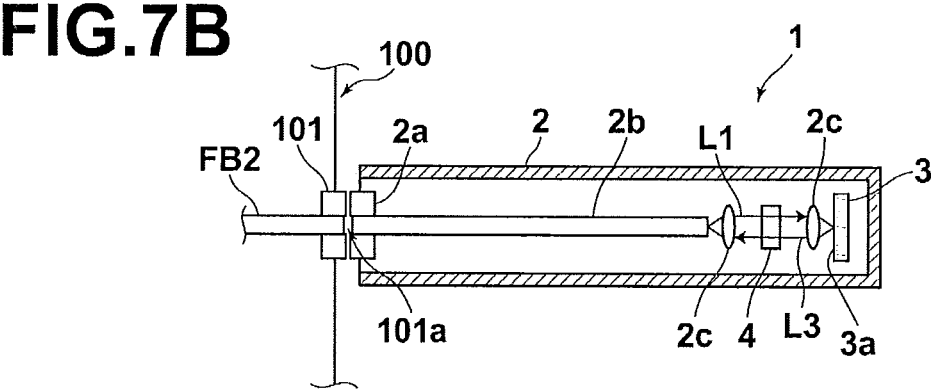
FIG. 7B is a diagram illustrating another variation of the calibration jig according to the third embodiment.

Next, a third embodiment of the calibration jig 1 is described. As in variations shown in FIGS. 7A and 7B, the calibration jig 1 may include an attenuation member 4. As described above, the light amount of the measurement light L1 is 9.9 mW, as one example. In actual measurement, however, the reflected light L3 is sufficiently attenuated with respect to the measurement light L1. Specifically, the detection range of the interference light detecting means 140 is set with assuming that the light amount of the reflected light L3, which is reflected when the measurement light L1 having the above light amount is applied to the subject to be measured Sb, is within the range from 1 nW to 100 nW at a point immediately before the combining means 104, as one example. Therefore, in a case where the reflective surface 3a has high reflectance, the attenuation member 4 can be provided in the calibration jig 1 to attenuate the reflected light L3 reflected from the reflective surface 3*a* so that the reflected light L3 has a light amount within the detection range of the interference light detecting means 140. As shown in FIGS. 7A and 7B, the attenuation member 4 in this embodiment is formed by inserting an ND filter between the center portion 101*a* and the reflective surface 3*a*, although this is not intended to limit the invention. In the above-described case where the end face of the optical fiber forms the reflective surface 3*a*, the end face may be obliquely cut, and this can provide attenuation of the returning reflected light L3 to around 4%. Alternatively, the reflective surface 3*a* may be provided with an uneven pattern, which reduces reflectance of the reflective surface 3*a* and thus serves as the attenuation member 4. That is, the reflective surface 3*a* may also serve as the attenuation member 4. Other features of the calibration jig 1 of the third embodiment are the same as those in the first embodiment and explanation thereof is omitted.

As described above, with the calibration jig 1 according to the first to third embodiments, the operator only has to attach the calibration jig 1 to the attachment section 101 of the optical tomographic imaging apparatus 100, and the measurement light L1 emitted from the emitting section 101*a* can be reflected at the reflective surface 3*a* back to the emitting section 101*a*. Thus, the optical tomographic imaging apparatus 100 can be calibrated in a simple and repeatable manner.

Figure 8A:
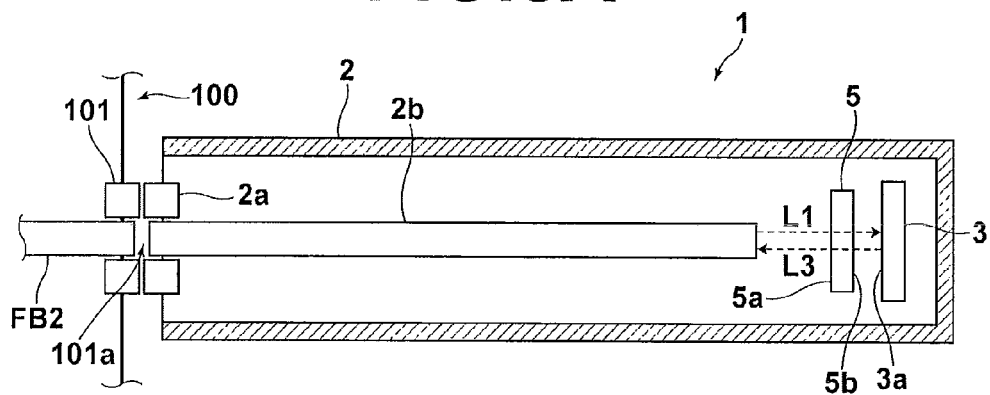
FIG. 8A is a diagram illustrating a variation of a calibration jig according to a fourth embodiment.
Figure 8B:
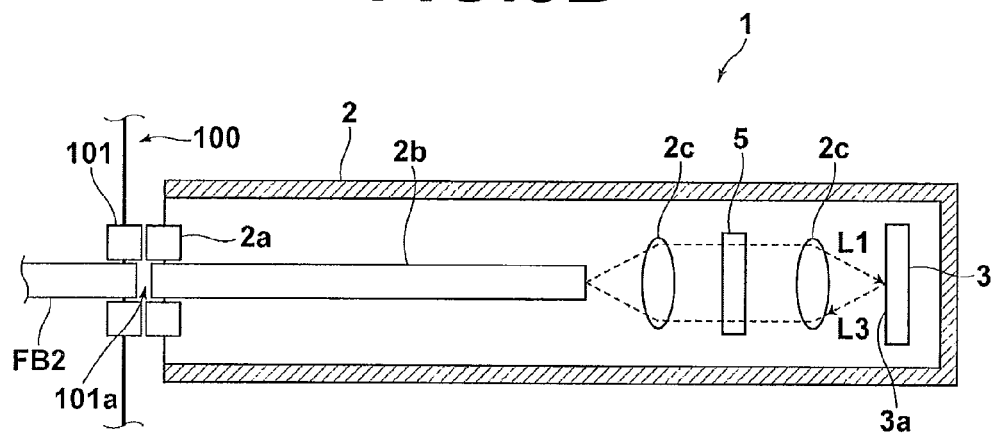
FIG. 8B is a diagram illustrating another variation of the calibration jig according to the fourth embodiment.

Next, a fourth embodiment of the calibration jig 1 of the invention is described. FIGS. 8A and 8B illustrate variations of the fourth embodiment of the calibration jig 1. The calibration jig 1 includes the holding member 2, which is attachable to the optical connector 101, the reflective member 3, which reflects the measurement light L1, and a light transmitting member 5, which generates the same dispersion as the sheath 203 of the optical probe 200 does. Other features of the calibration jig 1 of this embodiment are the same as those in the first embodiment, and detailed explanation thereof is omitted unless it is necessary.

The holding member 2 allows the measurement light L1 emitted from the center portion 101*a* to transmit through the light transmitting member 5 to be guided to the reflective member 3. In this embodiment, the measurement light L1 is indirectly guided to the reflective member 3 via the optical fiber 2*b* connected to the optical connector 2*a*, although this is not intended to limit the invention. The measurement light L1 may be guided via the optical system 2*c*, which is provided in place of the optical fiber 2*b*, or may be guided via both the optical fiber 2*b* and the optical system 2*c*, as shown in FIG. 8B. Alternatively, the measurement light L1 may directly transmit through the light transmitting member 5 to be guided to the reflective member 3.

The light transmitting member 5 is disposed between the center portion 101*a* and the reflective surface 3*a*, and allows the measurement light L1 emitted from the center portion 101*a* and the reflected light L3 reflected from the reflective surface 3*a* to transmit therethrough. The light transmitting member 5 is formed of the same material as the sheath 203 of the optical probe 200. Thus, during calibration using the calibration jig 1, the detected interference light L4 contains substantially the same dispersion as that in actual measurement.

Figure 9A:
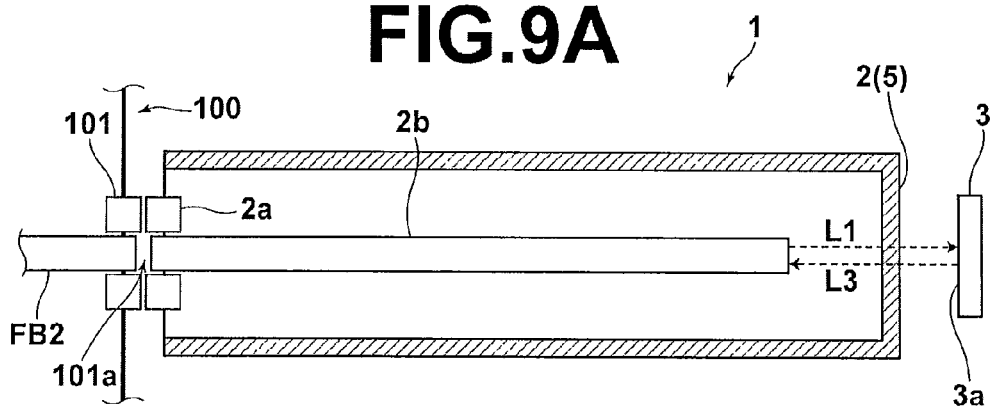
FIG. 9A is a diagram illustrating a variation of a calibration jig according to a fifth embodiment.
Figure 9B:
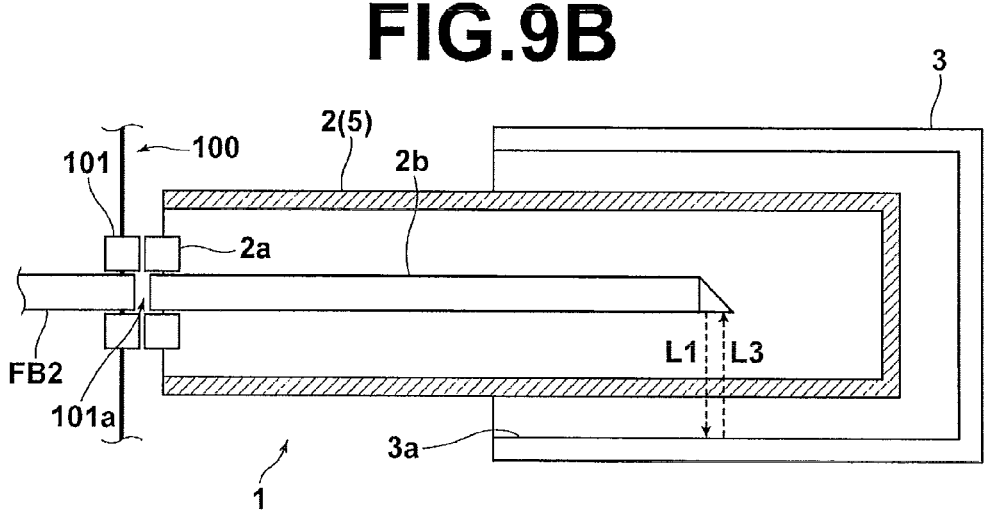
FIG. 9B is a diagram illustrating another variation of the calibration jig according to the fifth embodiment.

Next, a fifth embodiment of the calibration jig 1 is described. FIGS. 9A and 9B illustrate variations of the fifth embodiment of the calibration jig 1. As shown in FIGS. 9A and 9B, the entire or a part of the holding member 2 may be formed by the light transmitting member 5 so that the holding member 2 also serves as the light transmitting member 5. As shown in FIG. 9A, the measurement light L1 emitted from the optical fiber 2*b* transmits through the holding member 2 and is reflected at the reflective surface 3*a*, which is disposed outside the holding member 2. Then, the reflected light L3 transmits through the holding member 2 to enter the optical fiber 2*b*. As shown in FIG. 9B, an optical system may be provided at the distal end of the optical fiber 2*b* to change the traveling direction of the measurement light L1. In the variation shown in FIG. 9B, the reflective surface 3*a* may not necessarily cover the entire outer circumference of the holding member 2. It suffices that the reflective surface 3*a* covers substantially a half or more in the circumferential direction of the outer circumference of the holding member 2 including an area where the measurement light L1 is applied. The variation shown in FIG. 9B is particularly effective in a case where the above-described rotary joint is used as the attachment section 101 to which the optical fiber 2*b* is rotatably attached so that the measurement light L1 is moved to scan about the longitudinal axis. Other features of the calibration jig 1 of this embodiment are the same as those in the first embodiment and explanation thereof is omitted.

As described above, with the calibration jig 1 according to the fourth and fifth embodiments, the operator only has to attach the calibration jig 1 to the attachment section 101 of the optical tomographic imaging apparatus 100, and the measurement light L1 emitted from the emitting section 101*a* can transmit through the light transmitting member 5 and be reflected at the reflective surface 3*a* to enter the emitting section 101*a*. Thus, the optical tomographic imaging apparatus 100 can be calibrated in a simple and repeatable manner. Further, using the calibration jig including the light transmitting member 5 which generates the same dispersion as the sheath 203 does, the distortion due to the dispersion at the sheath of the optical probe can be corrected during calibration, thereby enabling acquisition of accurate tomographic information of the subject to be measured Sb.

Figure 10:
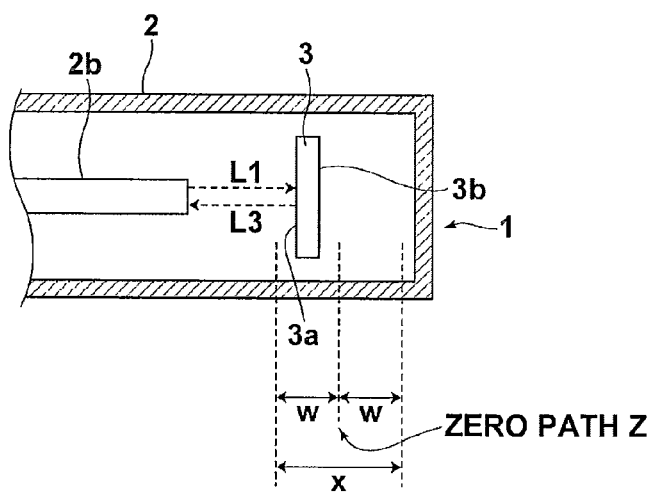
FIG. 10 is a diagram illustrating a relationship between a single reflective surface and a zero path.

As shown in FIG. 10, the reflective member 3 in all the above-described embodiments of the invention may be formed as a single reflective surface which is disposed within an area X corresponding to twice a coherence length W of the laser light L. The center of the area X is a position Z (hereinafter referred to as a zero path) of the reflective surface at which the measurement light L1 reflected at the reflective surface has the same optical path length as the optical path length of the reference light L2 from a point at which the laser light L is divided into the reference light L2 and the measurement light L1 to a point at which the reference light L2 and the measurement light L1 are combined. That is, the calibration jig 1 may include no reflective surface other than the reflective surface 3*a* within the area X. It should be noted that, in a case where the reflective surface 3*a* is provided with low reflectance, there may be influence of reflection at a rear surface 3*b* of the reflective member 3. In this case, the influence of reflection at the rear surface 3*b* can be avoided by adjusting the thickness of the reflective member 3 so that the rear surface 3*b* is not present within the area X.

Now, operation in the case where the reflective member 3 is formed as a single reflective surface is described.

Figure 11A:
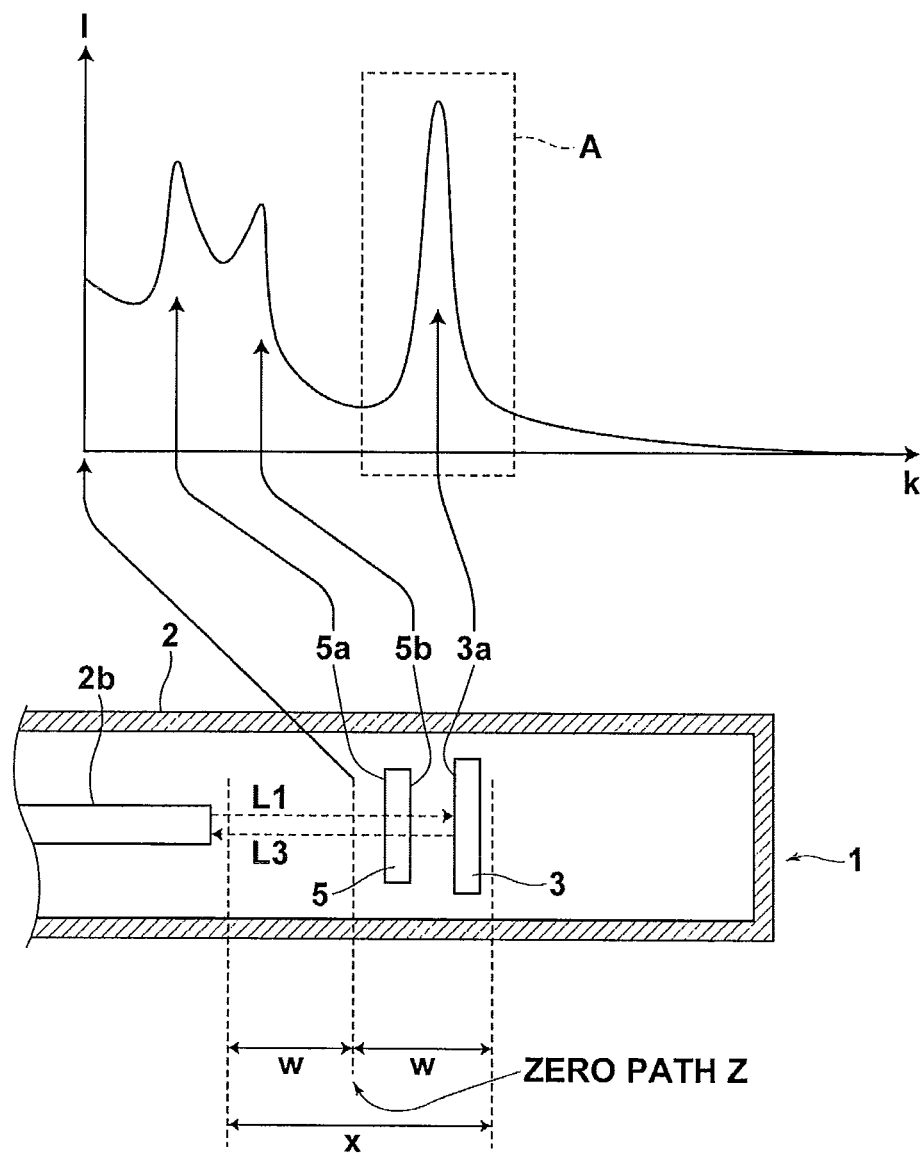
FIG. 11A is a conceptual diagram illustrating a relationship between positions of members and spectral peaks.
Figure 11B:
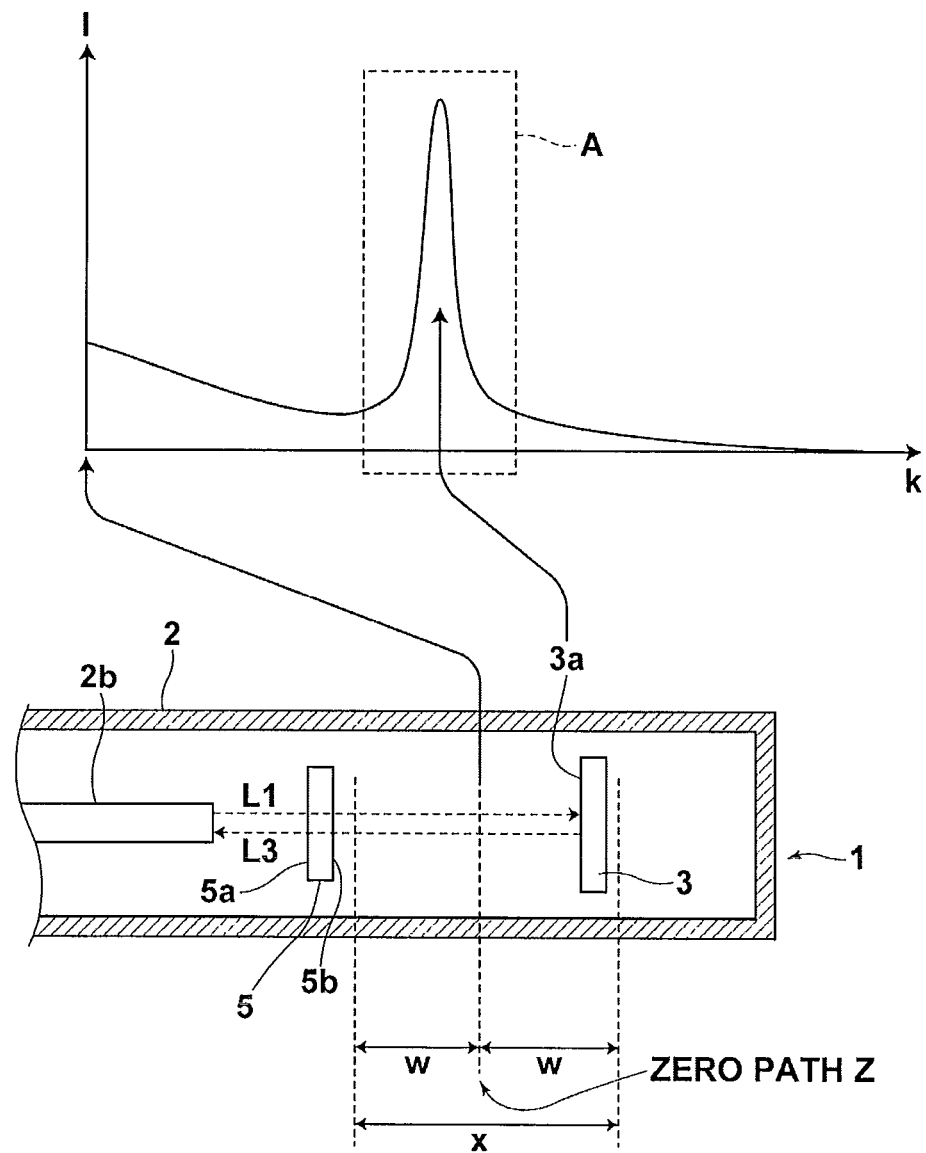
FIG. 11B is a conceptual diagram illustrating another relationship between positions of members and a spectral peak.

The reflective member 3 of the calibration jig 1 shown in FIG. 10 is directly or indirectly held by the holding member 2. The reflective member 3 includes the reflective surface 3*a* for reflecting the measurement light L1 emitted from the center portion 101*a*, and forms the single reflective surface within the area X corresponding to the coherence length W of the laser light L with the zero path being the center of the area. When the calibration jig 1 of this embodiment is used to calibrate the optical tomographic imaging apparatus, the operator only has to attach the calibration jig 1 to the attachment section 101 of the optical tomographic imaging apparatus 100, and the measurement light L1 emitted from the emitting section 101 can be reflected at the reflective surface 3a back to the emitting section 101. Further, even in a case where some other member (such as the attenuation member 4 or the light transmitting member 5 described above) is present in the holding member 2, the Fourier transformed interference signal does not contain more than one spectral peaks (FIG. 11A), and a single spectral peak can be obtained (FIG. 11B). It is therefore not necessary to cut out a peak of interest ("A" in the drawing) from more than one spectral peaks, which is an operation with a high degree of freedom, easy and repeatable calibration of the optical tomographic imaging apparatus can be achieved.

Next, calibration using the calibration jig 1 of the invention is described. the operator removes the optical probe 200 attached to the optical connector 101 of the optical tomographic imaging apparatus 100, and fits the optical connector 2a of the calibration jig 1 with the optical connector 101, thereby optically coupling the optical fiber FB2 with the optical fiber 2b.

Figure 5A:
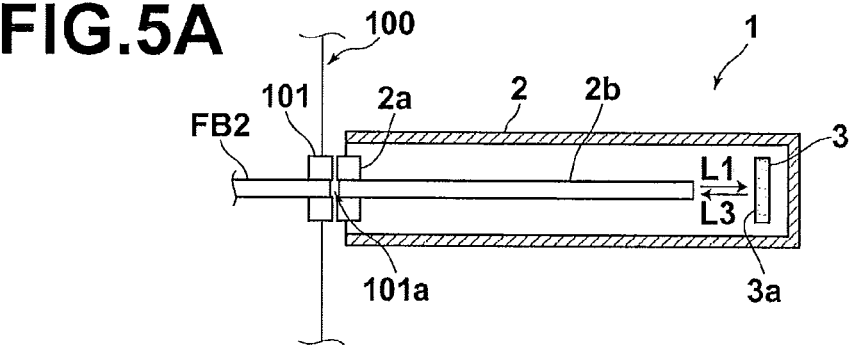
FIG. 5A is a diagram illustrating a variation of a calibration jig according to a first embodiment.
Figure 5B:
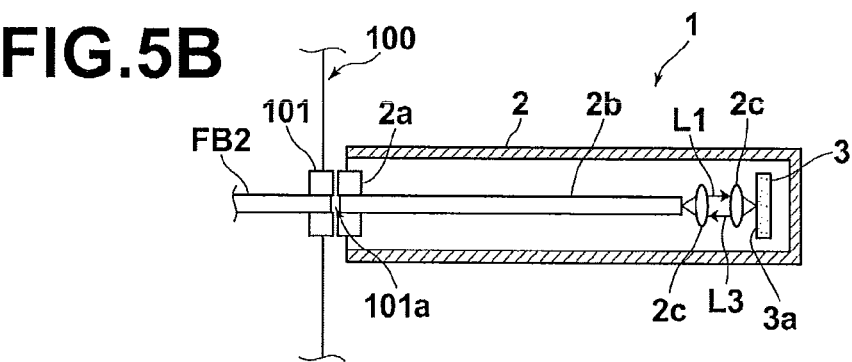
FIG. 5B is a diagram illustrating another variation of the calibration jig according to the first embodiment.
Figure 5C:
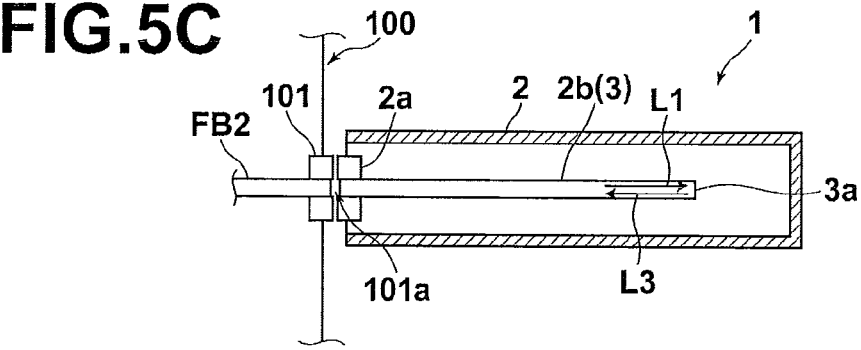
FIG. 5C is a diagram illustrating yet another variation of the calibration jig according to the first embodiment.
Figure 5D:
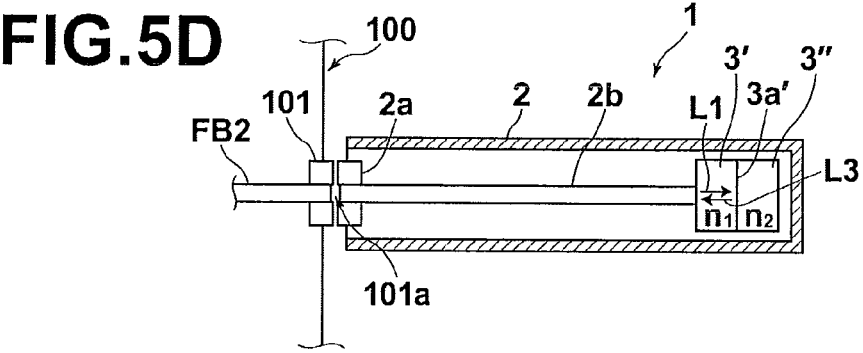
FIG. 5D is a diagram illustrating still another variation of the calibration jig according to the first embodiment.

For example, in a case where the calibration jig 1 shown in FIG. 5A is used, the measurement light L1 emitted from the center portion 101a enters the optical fiber 2b, and is guided through the optical fiber 2b to reach the reflective member 3. The reflected light L3 reflected from the reflective surface 3a of the reflective member 3 enters the optical fiber 2b, and is guided through the optical fiber 2b and the optical fiber FB2 to enter the combining means 104. The combining means 104 generates the interference light L4 between the reference light L2 and the reflected light L3. The interference light L4 is divided at the combining means 104 and the divided portions of the interference light L4 enter the interference light detecting means 140, where the interference signal IS is detected. In this case, the reflective surface present is only the reflective surface 3a of the reflective member 3.

On the other hand, in a case where the calibration jig 1 shown in FIG. 8A is used, for example, the measurement light L1 emitted from the center portion 101a enters the optical fiber 2b, is guided through the optical fiber 2b and transmits through the light transmitting member 5 to reach the reflective member 3. The reflected light L3 reflected from the reflective surface 3a of the reflective member 3 transmits through the light transmitting member 5 and enters the optical fiber 2b to be guided through the optical fiber 2b and the optical fiber FB2 to enter the combining means 104. The combining means 104 generates the interference light L4 between the reference light L2 and the reflected light L3. The interference light L4 is divided at the combining means 104 and the divided portions of the interference light L4 enter the interference light detecting means 140, where the interference signal IS is detected.

Therefore, when the calibration jig 1 shown in FIG. 8A is used, the measurement light L1 is reflected at a surface 5a of the light transmitting member 5 near the emitting section 101a, a surface 5b of the light transmitting member 5 near the reflective surface 3a, and the reflective surface 3a. That is, the calibration jig 1 has three reflective surfaces that reflect the measurement light L1.

If the calibration jig 1 has a single reflective surface, and change of the wavenumber k of the measurement light L1 is linear, the time domain waveform of the interference signal IS has a single frequency. However, the interference light L4 detected as described above using the calibration jig 1 shown in FIG. 5A or 8A has a waveform that is distorted from the time domain waveform with a single frequency, as shown in FIG. 3, due to characteristics of the light source unit 110 or influence of the presence of the three reflective surfaces.

It is therefore necessary to generate a calibration conversion table which corrects for the distortion, thereby achieving correct conversion. Now, a method for generating the calibration conversion table is described.

If the wavenumber k of the measurement light L1 entering the single reflective surface changes linearly with respect to the time, zero points (points where the intensity of the interference signal is at the middle between the maximum intensity $I_{max}$ and the minimum intensity $I_{min}$) of the interference signal IS are plotted at equal intervals with respect to the wavenumber k. Using this nature, the calibration conversion table is generated to rearrange the time domain waveform of the interference signal IS at equal intervals with respect to the wavenumber k. It should be noted that the points of the interference signal IS to be plotted at equal intervals are not limited to the zero points. That is, any group of points of the interference signal IS can be used as long as they have equal phase differences, such as $2\pi$, $\pi$ or $\pi/2$, therebetween. Examples of the group of points include a group of points of local maximum values with a phase difference of $2\pi$, a group of points of local maximum and local minimum values with a phase difference of n, or a group of points of local maximum and local minimum values and zero points with a phase difference of $\pi/2$. In view of ease of analysis and repeatability, however, use of the group of zero points may be preferred.

Therefore, the method for generating a calibration conversion table of this embodiment includes: extracting a group of points from the interference signal IS with respect to the time axis, which points are to be plotted at equal intervals in the interference signal IS with respect to the wavenumber axis; finding a time value corresponding to each point of the group of points; plotting, based on the time values, the group of points on a calibration conversion table at equal intervals along the wavenumber axis of the calibration conversion table; and interpolating between the plotted points of the group of points.

Figure 12:
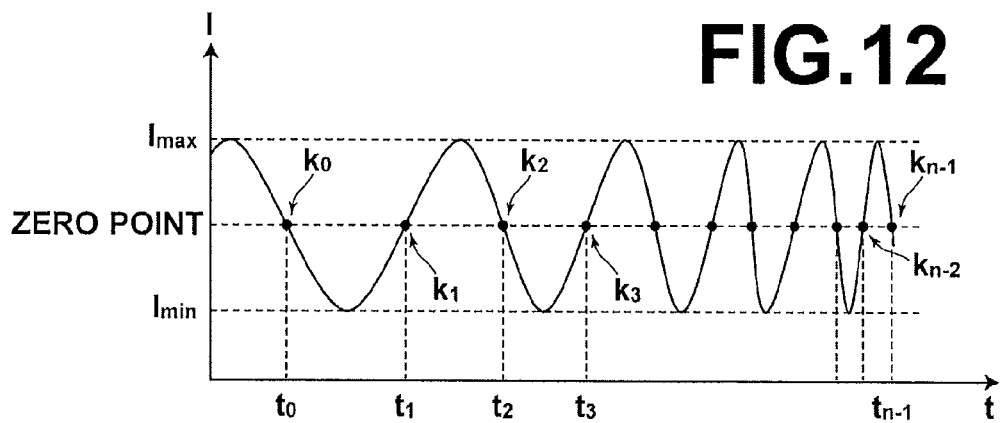
FIG. 12 is a graph illustrating the interference signal obtained when the calibration jig is attached.

Now, the method for generating a calibration conversion table from the interference signal IS, which is acquired using the calibration jig 1 shown in FIG. 5A, is specifically described with reference to FIGS. 12, 13A and 13B. As described above, the calibration jig 1 shown in FIG. 5A has a single reflective surface. First, as shown in FIG. 12, symbols $k_0, k_1, \ldots, k_{n-1}$ (n is the number of zero points in a sweep period) are assigned to the wavenumbers k at individual zero points in the interference signal IS, and time values $t_0, t_1, \ldots t_{n-1}$ corresponding to the wavenumbers $k_0, k_1, \ldots, k_{n-1}$ are found. The time values $t_0, t_1, \ldots, t_{n-1}$ may be found, for example, by estimating the zero points through linear approximation between two points adjacent to and at opposite sides of each zero point. In this case, the linear approximation between adjacent two points may be carried out after the number of data of the interference signal IS is increased by once applying Fourier transform to the interference signal IS, filling 0s at the high frequency side of the thus obtained data, and applying inverse Fourier transform to the resulting data. This allows more accurate estimation of the zero points. The method used for finding the time values $t_0, t_1, \ldots, t_{n-1}$ is not limited to the linear approximation. For example, the time values $t_0, t_1, \ldots, t_{n-1}$ may be estimated through spline approximation.

Figure 13A:
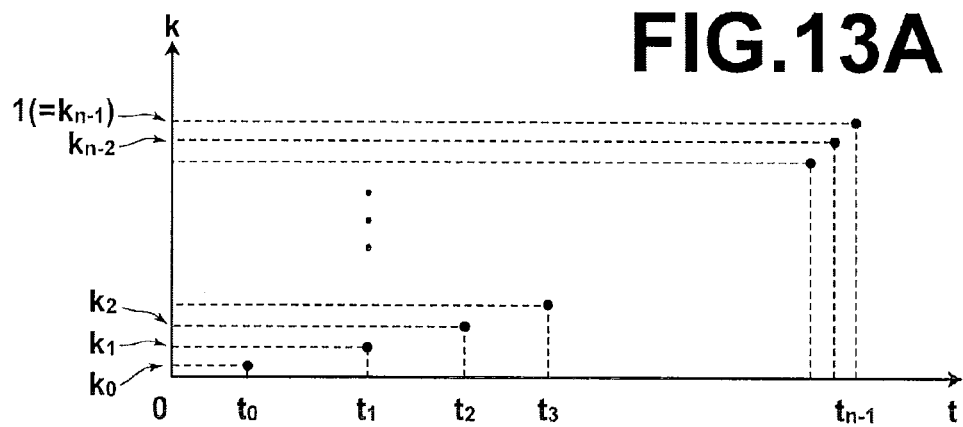
FIG. 13A is a diagram illustrating a process of generating a calibration conversion table.
Figure 13B:
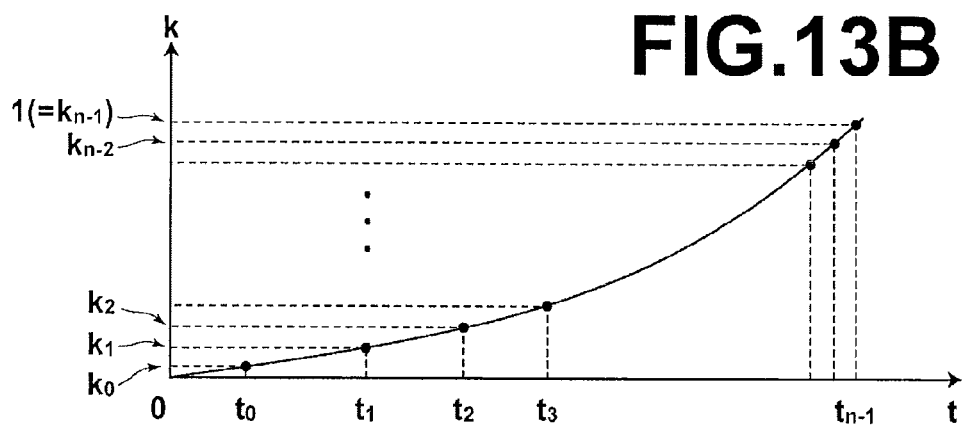
FIG. 13B is a diagram illustrating another process of generating a calibration conversion table.

Based on the thus estimated zero points, each point $(t_m, k_m)$ (m=0, 1, . . . , n−1) is plotted on the table with the transverse axis representing t and the vertical axis representing k such that the positions of $k_m$ are at equal intervals, as shown in FIG. 13A. That is, the positions of $k_0$ to $k_{n-2}$ are plotted along the vertical axis to divide a portion of the axis between "0" to "1" into equal n portions with the position of $k_{n-1}$ being "1". Then, the thus obtained points $(t_m, k_m)$ (m=0, 1, . . . , n−1) are interpolated, for example, by cubic spline interpolation to provide the calibration conversion table (FIG. 13B). It should be noted that the specific method used for interpolation is not particularly limited.

On the other hand, when the calibration jig 1 shown in FIG. 8A is used, it is necessary to take only the reflected light reflected at the reflective surface 3a into account for calibration. This may be achieved, for example, by the following method. First, the interference signal IS shown in FIG. 3 is Fourier transformed to obtain an intensity waveform of the interference light L4. As shown in FIG. 11A, the intensity waveform of the interference light L4 with respect to temporal spectrum obtained through the Fourier transform includes three peaks of the light intensity corresponding to the three reflective surfaces, i.e., the surface 5a, the surface 5b and the reflective surface 3a. Then, a peak region ("A" in the drawing) of the light intensity corresponding to the reflection at the reflective surface 3a is cut out and subjected to inverse Fourier transform to obtain a time domain waveform of the interference signal IS corresponding to the reflection at the reflective surface 3a. The time domain waveform of the inverse Fourier transformed interference signal IS is regarded as a time domain waveform of the light intensity with respect to a single reflective surface, i.e., the reflection at the reflective surface 3a. Subsequently, a group of points which are to be plotted at equal intervals along the wavenumber axis are extracted from the converted interference signal IS, and the above-described method for generating the calibration conversion table is applied to obtain the calibration conversion table in the similar manner.

As described above, by generating the calibration conversion table using the calibration jig and the method for generating a calibration conversion table according to the invention, the calibration conversion table can easily be generated from the interference signal.

Although the optical tomographic imaging apparatus 100 is described in the above embodiments as a SS-OCT apparatus, this is not intended to limit the invention. That is, the calibration jig 1 of the invention may be applied to a SD-OCT apparatus to generate a calibration conversion table which corrects a wavelength domain waveform of the intensity of the interference light L4, which is obtained through SD-OCT measurement, to provide equal intervals with respect to the wavenumber. It should be noted that, in the case of SS-OCT, the measurable range is determined by coherence length of the light source. Whereas, in the case of the SD-OCT, the measurable range is determined by a measurable range D, which is determined by wavelength width of the low-coherent light entering each one of arrayed light receiving elements. The measurable range D of the SD-OCT is derived by the equation below:

$$D = \Lambda_0 \cdot 2/\delta\lambda$$

wherein $\Lambda_0$ represents a center wavelength of the wideband light source, and $\delta\lambda$ represents a wavelength width of the light entering each light receiving element. Therefore, when the method for generating a calibration conversion table according to the invention is applied to the SD-OCT system, the description should be interpreted with reading the "coherence length" mentioned in the above-described embodiments with respect to the SS-OCT system as the "measurable range D".

Further, when the method for generating a calibration conversion table of the invention is applied to the SD-OCT system, the description should be interpreted with reading the time corresponding to the wavenumber in the case of the SS-OCT as a spatial displacement on the arrayed light receiving elements. In this manner, a calibration conversion table representing a relationship between the spatial displacement and the wavenumber can be provided.

EFFECT OF THE INVENTION

The calibration jig of the invention includes a holding member, which is removably attachable to an attachment section of an optical tomographic imaging apparatus for optically coupling the optical probe to the apparatus, and a reflective surface, which is held by the holding member and which reflects the measurement light emitted from an emitting section of the attachment section and directs the reflected light back to the emitting section. When the operator calibrates the optical tomographic imaging apparatus, the operator removes the optical probe from the attachment section of the optical tomographic imaging apparatus, and then attaches the holding member of the calibration jig of the invention to the attachment section. With this simple operation, the reflective surface held by the holding member reflects the measurement light emitted from the emitting section of the attachment section and directs the reflected light back to the emitting section. Thus, the operator can make the reflected light of the measurement light accurately enter the emitting section in a simple manner, and repeatability of the calibration is improved.

In the calibration jig of the invention, the holding member may also serve as the reflective surface to simplify the structure of the calibration jig. This improves manufacturing accuracy of the calibration jig, which in turn improves repeatability of the calibration.

The calibration jig of the invention may further include an attenuator section that attenuates the reflected light. In this case, the reflected light can be attenuated depending on the reflectance of the reflective surface so that the intensity of the detected interference light is within a range detectable by the optical tomographic imaging apparatus.

If the optical probe of the optical tomographic imaging apparatus is covered with a sheath, which transmits the measurement light to be applied to the subject to be measured and transmits the reflected light to be guided through the optical probe, the calibration jig may include a light transmitting member disposed between the emitting section and the reflective surface, which light transmitting member transmits the measurement light and the reflected light reflected from the reflective surface, and generates the same dispersion as dispersion generated when the measurement light and the reflected light reflected from the subject to be measured transmit through the sheath. In this case, when the operator calibrates the optical tomographic imaging apparatus, the operator removes the optical probe from the attachment section of the optical tomographic imaging apparatus, and then attaches the holding member of the calibration jig of the invention to the attachment section. With this simple operation, distortion due to the dispersion at the sheath can be corrected during the calibration.

In the calibration jig of the invention, the holding member may also serve as the light transmitting member to simplify the structure of the calibration jig. This improves manufacturing accuracy of the calibration jig, which in turn improves repeatability of the calibration.

Further, in a case where a frequency-swept light source is used, the reflective surface of the calibration jig according to the invention forms a single reflective surface which is disposed within an area corresponding to twice a coherence length of the laser light at a certain instant, with the center of the area being a position (zero path) of the reflective surface at which the measurement light reflected at the reflective surface has a same optical path length as an optical path length of the reference light from a point at which the laser light is divided into the reference light and the measurement light to a point at which the reference light and the measurement light are combined. On the other hand, in a case where a light source having a wide emission wavelength band is used, and the signal from the subject to be measured is split into spectral components and is detected with a photodetector array, the reflective surface of the calibration jig forms a single reflective surface which is disposed within a measurable range of the detector, which is determined by the number of pixels of the detector. Thus, even when some other member is present in the holding member, the Fourier transformed interference signal does not contain more than one spectral peaks, i.e., contains only a single spectral peak. Thus, it is not necessary to cut out a peak of interest from the more than one spectral peaks, which is an operation with a high degree of freedom, and easy and repeatable calibration of the optical tomographic imaging apparatus can be achieved.

What is claimed is:

1. A calibration jig for calibrating an optical tomographic imaging apparatus, the apparatus including an optical probe and an attachment section for optically coupling the optical probe to the apparatus in a removable manner, the apparatus acquiring a tomographic image of a subject to be measured by: emitting light; dividing the emitted light into reference light and measurement light; emitting the measurement light from an emitting section of the attachment section; guiding the measurement light through the optical probe and applying the measurement light to the subject to be measured; combining the reference light with reflected light, the reflected light being reflected from the subject to be measured and guided through the optical probe; detecting interference light of the combined reference light and reflected light as an interference signal; and acquiring the tomographic image using the interference signal, the calibration jig comprising:
a holding member removably attachable to the attachment section; and
a reflective surface held by the holding member, the reflective surface reflecting the measurement light emitted from the emitting section and directing the reflected light back to the emitting section,
wherein the attachment section is for optically coupling the optical probe to the apparatus, and
wherein
the optical probe of the optical tomographic imaging apparatus is covered with a sheath, the sheath transmits the measurement light to be applied to the subject to be measured and transmits the reflected light to be guided through the optical probe,
the calibration jig comprises a light transmitting member disposed between the emitting section and the reflective surface, the light transmitting member transmits the measurement light and the reflected light reflected from the reflective surface, and
the light transmitting member generates same dispersion as dispersion generated when the measurement light and the reflected light reflected from the subject to be measured transmit through the sheath.

2. The calibration jig as claimed in claim 1, wherein the holding member also serves as the reflective surface.

3. The calibration jig as claimed in claim 1, further comprising an attenuator section for attenuating the reflected light reflected at the reflective surface.

4. The calibration jig as claimed in claim 3, wherein the reflective surface also serves as the attenuator section.

5. The calibration jig as claimed in claim 3, wherein the attenuator section attenuates the reflected light reflected at the reflective surface to provide an intensity of the reflected light in the range from 1 nW to 100 nW.

6. The calibration jig as claimed in claim 1, wherein the holding member also serves as the light transmitting member.

7. The calibration jig as claimed in claim 6, wherein the reflective surface held by the holding member provides a uniform optical path length from the emitting section to the reflective surface at the entire surface of the reflective surface and covers substantially a half or more in a circumferential direction of an outer circumference of the holding member.

8. A calibration jig as recited in claim 1, wherein the holding member has a support member, and the support member performs attachment of the calibration jig to the attachment section.

9. A calibration jig as recited in claim 8, wherein the support member is one of an optical connector and a screw.

10. A calibration jig for calibrating an optical tomographic imaging apparatus, the apparatus including an optical probe and an attachment section for optically coupling the optical probe to the apparatus in a removable manner, the apparatus acquiring a tomographic image of a subject to be measured by: emitting laser light from a frequency-swept laser light source with temporally swept optical frequency; dividing the laser light into reference light and measurement light; emitting the measurement light from an emitting section of the attachment section; guiding the measurement light through the optical probe and applying the measurement light to the subject to be measured; combining the reference light with reflected light, the reflected light being reflected from the subject to be measured and guided through the optical probe; detecting interference light of the combined reference light and reflected light as an interference signal; and acquiring the tomographic image using the interference signal, the calibration jig comprising:
a holding member removably attachable to the attachment section; and
a single reflective surface held by the holding member, the single reflective surface being disposed within an area corresponding to twice a coherence length of the laser light, a center of the area being a position of the reflective surface at which the measurement light reflected at the reflective surface has a same optical path length as an optical path length of the reference light from a point at which the laser light is divided into the reference light and the measurement light to a point at which the reference light and the measurement light are combined,
wherein the attachment section is for optically coupling the optical probe to the apparatus, and
wherein
the optical probe of the optical tomographic imaging apparatus is covered with a sheath, the sheath transmits the measurement light to be applied to the subject to be measured and transmits the reflected light to be guided through the optical probe,
the calibration jig comprises a light transmitting member disposed between the emitting section and the reflective surface, the light transmitting member transmits the measurement light and the reflected light reflected from the reflective surface, and
the light transmitting member generates same dispersion as dispersion generated when the measurement light and the reflected light reflected from the subject to be measured transmit through the sheath.

11. A calibration jig as recited in claim 10, wherein holding member has a support member, and the support member performs attachment of the calibration jig to the attachment section.

12. A calibration jig as recited in claim 11, wherein the support member is one of an optical connector and a screw.

13. A calibration jig for calibrating an optical tomographic imaging apparatus, the apparatus including an optical probe and an attachment section for optically coupling the optical probe to the apparatus in a removable manner, the apparatus acquiring a tomographic image of a subject to be measured by: dividing low-coherent light having a wide emission wavelength band into reference light and measurement light; emitting the measurement light from an emitting section of the attachment section; guiding the measurement light through the optical probe and applying the measurement light to the subject to be measured; combining the reference light with reflected light, the reflected light being reflected from the subject to be measured and guided through the optical probe; spatially dispersing interference light of the combined reference light and reflected light with respect to frequency and detecting the interference light as an interference signal with a plurality of spatially arrayed light receiving elements; and acquiring the tomographic image using the interference signal, the calibration jig comprising:
a holding member removably attachable to the attachment section; and
a single reflective surface held by the holding member, the single reflective surface being disposed within a measurable range determined by a wavelength width of the low-coherent light entering each one of the light receiving elements,
wherein the attachment section is for optically coupling the optical probe to the apparatus, and
wherein
the optical probe of the optical tomographic imaging apparatus is covered with a sheath, the sheath transmits the measurement light to be applied to the subject to be measured and transmits the reflected light to be guided through the optical probe,
the calibration jig comprises a light transmitting member disposed between the emitting section and the reflective surface, the light transmitting member transmits the measurement light and the reflected light reflected from the reflective surface, and
the light transmitting member generates same dispersion as dispersion generated when the measurement light and the reflected light reflected from the subject to be measured transmit through the sheath.

14. A calibration jig as recited in claim 13, wherein the holding member has a support member, and the support member performs attachment of the calibration jig to the attachment section.

15. A calibration jig as recited in claim 14, wherein the support member is one of an optical connector and a screw.

* * * * *